United States Patent Office 3,641,209
Patented Feb. 8, 1972

3,641,209
EMULSION POLYMERIZATION EMPLOYING AZOACYL CATALYSTS
Karl-Heinz Ott, Leverkusen, Herbert Schuster, Cologne-Stammheim, Walter Meckel, Dusseldorf, Karl Dinges, Odenthal, and Erwin Müller, Leverkusen, Germany, assignors to Farbenfabriken Bayer Aktiengesellschaft, Leverkusen, Germany
No Drawing. Filed Mar. 7, 1969, Ser. No. 805,348
Claims priority, application Germany, Mar. 26, 1968,
P 17 70 059.3
Int. Cl. C08f *15/04, 19/18, 1/13*
U.S. Cl. 260—880    3 Claims

ABSTRACT OF THE DISCLOSURE

Process for producing graft copolymers from styrene, substituted styrenes and methyl methacrylate and from acrylonitrile, methacrylonitrile, methacrylates or mixtures thereof by polymerisation in the presence of an azoacyl compound as a catalyst.

---

This invention relates to the production of thermoplastic-elastic moulding compositions of high impact strength from copolymer and graft polymer mixtures of acrylonitrile, butadiene, styrene and methyl methacrylate. In particular, the invention relates to the production of thermoplastic-elastic moulding compositions from copolymer and graft polymer mixtures of acrylonitrile, butadiene and styrene (ABS polymers).

High-impact thermoplastic moulding compositions of the kind in question can be obtained by combining polymers which, on their own, are hard and brittle such as polystyrene for example, or copolymers of styrene with acrylonitrile with polymers which, on their own, are soft and more or less elastomeric, for example, butadiene-styrene or butadiene-acrylonitrile copolymers.

In order to improve the compatibility of these polymers, the resin-like components (for example styrene and acrylonitrile) have already been polymerised in the presence of a polymeric rubber-like component (for example butadiene homo- or co-polymer). The graft copolymers thus obatined are resin-like, thermoplastic or elastomeric in character, depending upon the quantitative ratios of the components. Accordingly, these products are themselves thermoplastic moulding compositions. However, they may also be mixed with separately prepared thermoplastic copolymers, such as styrene/acrylonitrile copolymers.

The technological properties of graft copolymers such as these are governed not only by the type of monomers and polymers used and the quantities in which they are used, but also by the methods used to prepare them. For example, by block, block-suspension or suspension polymerisation ABS polymers are obtained which have average impact strength, and a matt surface. Emulsion polymerisation yields graft copolymers which, have good impact strength, and outstanding surface gloss.

Numerous processes are known for preparing graft polymers in aqueous emulsion by the polymerisation of styrene or styrene and acrylonitrile (or even other monomers) in a latex of a butadiene polymer.

In organic peroxidic compounds, such as potassium or ammonium peroxydisulphate, or organic peroxides, for example, benzoyl peroxide or cumene hydroperoxide, are conventionally used as catalysts in the production of these graft polymers. So-called Redox systems have also been used, comprising a combination of the aforementioned inorganic or organic peroxidic compounds with inorganic or organic reducing agents, for example sodium pyrosulphite, sodium formaldehyde sulphoxylate or dextrose.

Whereas products of average to good impact strength are obtained when the inorganic peroxidic compounds or the Redox systems are used, excessive polymer precipitation, i.e. coagulate formation, occurs when organic peroxidic compounds are used to catalyse the instant graft polymerisation in aqueous emulsion. In other words, activator systems of the latter kind cannot be used in large scale production.

Aliphatic azo compounds have also been used to initiate the radical-induced homopolymerisation and copolymerisation of monomers containing vinyl groups and vinylidene groups. Aliphatic azo compounds are compounds which correspond to the formula

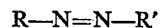

in which R and R' each represent an alkyl radical, a cycloalkyl radical or an aralkyl radical. The alkyl radicals may be substituted, for example by hydroxy, carboxyl, nitrile, sulphonic acid or tertiary amino groups. Cyclic azo compounds, in which the N═N grouping is part of a ring system, are also suitable. For commercial purposes, azoisobutyrodinitrile is widely used.

When these catalysts are used, the polymerisation reaction proper is not accompanied by any oxidative side reactions. Accordingly, the resulting polymers show less discolouration and greater resistance to light. Undesirable crosslinking reactions are largely avoided, so that polymers produced in this way often show improved solubility.

The aforementioned activators are only soluble in organic solvents, for example in the monomers. Their application is limited to solution or suspension polymerisation. Large scale polymerisation in aqueous emulsion cannot be carried out for the same reasons which prevent the use of organic peroxidic compounds, for example excessive coagulate formation. This is apparent from Rubber Chemistry and Technology, 38, No. 3 (1965), page 655, where it is stated that catalysts of this kind produce either no graft reaction at all or only a totally insignificant graft reaction. No technological significance is attached to the resulting products. Due to the coagulate formation which accompanies the polymerisation, a process of this kind cannot be carried out on a commercial scale.

It has been found that the polymerisation in aqueous emulsion of (a) styrene, nuclear or side-chain alkylated styrene, methyl methacrylate or mixtures thereof and (b) acrylonitrile, methacrylonitrile and methyl methacrylate or mixtures thereof can be carried out in the presence of a butadiene polymer latex containing at most 40% of other copolymerised monomers by using, as catalysts, azoacyl compounds corresponding to the formula

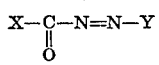

In this formula, (a) X=R; and

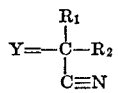

in which $R_1$ and $R_2$ each represent alkyl radicals with from 1 to 6 carbon atoms or together represent a cycloalkyl radical with from 4 to 8 carbon atoms, and R represents phenyl or $C_1$–$C_6$ alkyl.

(b) 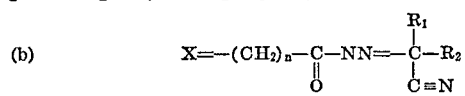

and

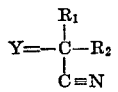

in which $R_1$ and $R_2$ have the meanings given above and $n$ represents a number from 1–8, or (c) X=R; and

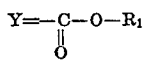

in which R and $R_1$ have the meanings given above.

These compounds, suitable for use as catalysts, may be divided up into three groups which may be represented as follows:

(1) Compounds which correspond to the formula

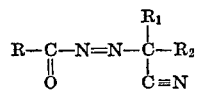

(2) Compounds which correspond to the formula

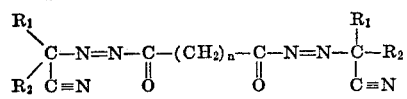

(3) Compounds which correspond to the formula

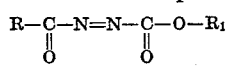

The general radicals in these formulae have the same meanings as indicated above.

One particularly preferred group of azoacyl compounds may be represented by the formula

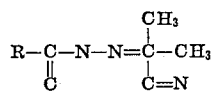

in which R represents a methyl or ethyl group. The azoacyl compounds of the formulae shown above are new.

They may be prepared by oxidising the corresponding hydrazo compounds (from the reaction of acyl hydrazides with ketone cyanhydrazides or chloroformic acid esters) in an organic solvent, for example benzene or in a water-solvent suspension, with the calculated quantity of halogen, for example chlorine, at temperatures of from 0 to 40° C. After the solvent has been distilled off, the products are obtained in a yield of approximately 80 to 90%, either in the form of yellowish-red liquids or in the form of coloured crystals.

Examples of azoacyl compounds that are particularly suitable as catalysts include acetyl-(2-cyanoisopropyl)-diazene; propionyl-(2 - cyanoisopropyl)-diazene; acetyl carbethoxydiazene; and benzoylcarbethoxydiazene.

Emulsion polymerisation with the aforementioned catalysts is carried out by the conventional methods of emulsion polymerisation. In general, the catalysts are used in quantities of from 0.1 to 3% by weight, based on the monomer or monomers.

One particular preferred application of the catalysts according to the invention is the production of high-impact thermoplastic moulding compositions of the following composition.

(A) 5–60% by weight and preferably 10–40% by weight of butadiene homopolymer, and
(B) 95–40% by weight and preferably 90–60% by weight of a polymerised mixture of 50–95% by weight of styrene and 5–50% by weight of acrylonitrile (These two monomers may be replaced either wholly or in part by their respective alkyl derivatives), at least 20% by weight of the total amount of polymerised styrene and acrylonitrile present being graft polymerised in the presence of the butadiene polymer. The polybutadiene content of the graft polymer is not intended to be any greater than 80% by weight.

In addition, blends are preferably obtained from (A) 60–10% by weight of a graft copolymer obtained in accordance with the above procedure from 40–70% by weight of butadiene polymer, and 60–30% by weight of a mixture of 95–50% by weight of styrene and 5–50% by weight of acrylonitrile, and
(B) 40–90% by weight of a separately polymerised copolymer of 95–50% by weight of styrene and 5–50% by weight of acrylonitrile (These two monomer components may be replaced either wholly or in part by their respective alkyl derivatives.)

Preferred butadiene polymers include homopolymers of butadiene and also copolymers of butadiene with other aliphatic conjugated diolefins containing from 4 to 6 carbon atoms, and with monovinyl and monovinylidene monomers. The following are examples of typical comonomers: acrylonitrile, styrene, acrylates and methacrylates, and isoprene. The graft base present in latex form is preferably intended to have an average particle size of from 0.1 to 0.6μ (as measured by means of a Svedberg ultracentrifuge). If desired, the butadiene may also be completely replaced by isoprene.

The butadiene polymer latex used as graft base is prepared in known manner by polymerising the monomer or monomers in aqueous emulsion. The required ultimate particle size is also adjusted by methods known per se, for example by polymerisation in concentrated emulsion, i.e. preferably using less than 100 parts by weight of aqueous phase for 100 parts by weight of monomer; using relatively small quantities of emulsifier, staggering the emulsifier or suitable electrolyte additions.

Compounds of acids of the kind which, as free acids, do not show any emulsifying properties, are preferably used as emulsifiers both for preparing the graft base and for the graft copolymerisation reaction, examples including salts of long-chain carboxylic acids with from 10 to 20 carbon atoms, such as oleic acid, stearic acid or disproportionated abietic acid. If desired, however, other emulsifiers may also be used, for example alkyl sulphonates and sulphonates, arylalkyl sulphonates, and reaction products of 5 to 20 mols of ethylene oxide with 1 mol of fatty alcohol containing 10 to 20 carbon atoms or 1 mol of alkyl phenol.

The usual inorganic or organic compounds may be used as polymerisation catalysts in the preparation of the graft base, for example potassium or ammonium persulphate, cumene hydroperoxide or p-menthane hydroperoxide which are employed in the conventional quantities, of from 0.05 to 5%, based on total monomer. It is of course also possible to use redox systems of the aforementioned peroxidic compounds and reducing agents, based in particular on acids of sulphur in low sulphur valency states such as bisulphites, pyrosulphites or sodium formaldehyde sulphoxylate, or organic bases, such as triethanolamine.

The graft base may be polymerised at pH values of from 2 to 12. A pH range of from 7 to 11 is preferred. Suitable polymerisation temperatures are those in the range from 20 to 100° C. and preferably those in the range from 40 to 80° C.

Polymerisation of the butadiene polymer may be stopped before complete conversion has been obtained. A complete conversion of the monmers is preferred, in which case a largely crosslinked polymer is formed. In this case, the gel content (component insoluble in toluene) is greater than 70%, the Defo hardness of the polymers is greater than 1000 and their Mooney viscosity (ML–4) greater than about 70.

Any unreacted monomers, above all butadiene, are removed by stirring at reduced pressure, by flushing with nitrogen or by means of a falling film evaporator.

Various methods may be used to prepare the graft polymers. They may be characterised as follows:

(1) The butadiene polymer latex is diluted with water to such concentration that the graft polymer latex to be prepared has a solids concentration of from 20 to 50% by weight. The greater part of the monomers to be grafted is emulsified with stirring into the diluted latex, optionally in the presence of more emulsifier.

After the requisite polymerisation temperature has been adjusted, the mixture is polymerised by adding the activator dissolved in a fairly small part of the monomer mixture, in portions or even continuously. In this connection, it has proved to be of advantage to cool the activator solution and to start with a stabilised monomer solution.

(2) The graft polymerisation reaction may also be carried out by running the monomers continuously into the butadiene polymer latex heated to the reaction temperature. The activator according to the invention is dissolved in the monomer mixture and introduced with it. In this instance, too, it is of advantage to start with a cooled monomer/activator solution and to dissolve the activator according to the invention in a stabiliser-containing monomer mixture.

In a special embodiment of the process, the monomer addition is calculated to maintain a predetermined monomer content in the polymerising emulsion. The activator is then continuously introduced in pure form. If the activator used is one which is crystalline in pure form, it is first dissolved in a suitable solvent and then introduced in the form of a solution.

(3) In another embodiment, an emulsion is initially prepared from the dilute butadiene polymer latex, optionally more emulsifier and the larger part of the monomers, and some of this emulsion is introduced into a suitable vessel. After the required polymerisation temperature has been reached, the polymerisation reaction is initiated by the addition of a fairly small portion of a monomer/activator solution, and the larger part of the emulsion together with the monomer/activator solution is continuously introduced into the vessel.

It is possible by using azoacyl compounds of the formulae given above to obtain thermoplastic graft polymers and thermoplastic graft copolymers whose notched impact strength and impact strength are up to 80%, or even more, above the equivalent data obtained with conventional systems. By virtue of their high reactivity, it is also possible, using these polymerisation initiators, to carry out graft polymerisation reactions in aqeous emulsion without any coagulate formation.

The quantity of activator required to prepare the graft polymers may vary within wide limits. For example, a quantity of from 0.1 to 5% by weight, based on the starting monomers, and preferably from 0.1 to 2% by weight, is used.

The reaction temperature is conveniently in range from 25 to 100° C. and preferably in the range from 50 to 100° C.

The monomers, polymerised either wholly or in part in the presence of the diene polymer, may consist of pure styrene or, in a preferred embodiment, of a monomer mixture consisting of from 95 to 5% by weight of styrene and from 5 to 50% by weight of acrylonitrile. The styrene may be replaced by nuclear- or side-chain-substituted styrenes or methyl methacrylate, and the acrylonitrile by methacrylonitrile or again by methyl methacrylate.

The required amount of polymerised monomers in the end product may be polymerised, either wholly or only in part, in the presence of the butadiene polymer, in which case the remainder, if any, may be added in already polymerised form. At least 20 parts by weight of monomer per 100 parts by weight of butadiene polymer should, however, be polymerised in the presence of the butadiene polymer using the aforementioned catalysts.

In principle there are no restrictions to the type of emulsifier used for the graft polymerisation reaction. Surfactants similar to those which have already been described with reference to the preparation of the graft base, may be used. The choice is limited solely by the pH value at which polymerisation is to be carried out, and by the coagulation conditions which it is desired to employ in order to isolate the polymer.

The graft reaction may also be carried out in the absence of additional emulsifier, if the emulsifying effect of the emulsifier present in the butadiene polymer latex is sufficient. The stability of the graft latex is, however, usually lower in this embodiment. In general, the emulsifier is used in quantities of from 0% to 10% by weight, and preferably in quantities of up to 5% by weight, based on the graft polymer.

The pH range to be maintained is governed both by the emulsifier system and by the monomer used. Generally polymerisation may be carred out at pH values of from 2 to 12. Where emulsifiers which do not have any emulsifying properties in the acid range are used, it is preferred to conduct polymerisation at pH values of from 7 to 11. If the monomer mixture contains readily hydrolysable monomers, such as methyl methacrylate, polymerisation will be carried out at pH values of around 7 and less.

In order to regulate molecular weight, i.e., the chain length of those components grafted onto the butadiene polymer, conventional regulators, such as dodecyl mercaptan, may be used in quantities of up to about 2%, by weight, based on the polymer.

When only a part of the required monomers are polymerised in the presence of the butadiene polymer latex, the remainder may be separately polymerised by methods and under conditions similar to those used in the preparation of the graft polymers. The monomer mixture of the separately polymerised component may have a composition similar to or different from that of the monomer mixture polymerised in the presence of the butadiene polymer latex.

The graft polymer may be mixed with the separately polymerised monomer component, either through the latices or even in solid form on mixing rolls, single- and multiple-screw extruders and internal mixers.

The choice of the composition of the graft polymers or graft copolymers is governed by the properties required of the end product. A butadiene polymer content of about 5% by weight represents the lower limit at which the elasticising effect of the rubber is noticeable. The product is extremely hard. Its notched impact strength increases whilst its hardness decreases with increasing butadiene polymer content. Where they contain more than about 60% by weight of butadiene polymer, the products are extremely difficult to process thermoplastically.

Irrespective of their butadiene polymer content, the graft polymers and graft copolymers prepared with the aid of the activators used according to the invention show considerably better notched impact strength than graft polymers and graft copolymers prepared with the conventional polymerisation activators.

The polymers are isolated from the latices or latex mixtures by coagulation with dilute acids, for example acetic acid or hydrochloric acid; by the addition of electrolytes, such as sodium chloride, calcium chloride, magnesium sulphate or aluminium sulphate; by concentration through evaporation; or by freezing.

The product obtained after separation through filtration, centrifuging, washing and drying is consolidated on mixing rolls, kneaders, internal mixers or similar machines at temperatures of from 140 to 220° C. and converted into a granulate by known methods. Dyes, pigments, stabilisers, lubricants, plasticisers and other additives may be added either before or during granulation.

The products obtained by the process according to the invention may be converted into a variety of objects by the methods normally used to process thermoplastic compositions. Thus, the granulate may be processed to form shaped objects in injection-moulding machines. Sections, sheeting and piping can be produced by means of extruders. The sheeting can be further processed, for example by vacuum-forming or pressure-forming, into housings, containers, shells and the like.

The use of the described catalysts has the following advantages over these conventional catalysts:

(1) In comparison with conventional polymerisation initiators, it is possible with azoacyl compounds to prepare thermoplastic moulding compositions of higher impact and notched impact strength.

(2) By virtue of their high reactivity, above all in the presence of water, the azoacyl compounds, unlike aliphatic azo compounds, do not promote coagulate formation during polymerisation in aqueous medium, in other words catalysts of this kind may also be used on a commercial scale.

The process according to the invention as illustrated by the following examples in which the parts and percentages indicated are always parts and percentages by weight unless otherwise stated.

EXAMPLE 1

(A) Preparation of the graft polymer 1332 g. of a 56.3% polybutadiene latex containing 750 parts by weight of polybutadiene are diluted with 2224 g. of desalted water in a glass reaction vessel equipped with stirring mechanism, thermometer and two dropping funnels. The butadiene latex used here has an average particle diameter of $0.3\mu$ (as measured in an ultra-centrifuge by Svedberg's method; of in this connection Svedberg & Pedersen "Die Ultrazentrifuge," Verlag Steinkopf 1940, pages 249 and 300).

After the air has been displaced by nitrogen, the reaction mixture is heated to 70° C. and the following components are introduced uniformly over a period of 4 hours;

(a) A monomer mixture consisting of 540 g. of stabilized styrene and 210 g. of acrylonitrile containing in addition 7.5 g. of acetyl-(2-cyanoisopropyl)-diazene;

(b) An emulsifier solution consisting of 375 g. of deionized water, 42.9 g. of the sodium salt of disproportionated abietic acid and 22.5 g. of normal sodium hydroxide.

The reaction temperature is kept at 70° C. by external cooling. After the monomers have been added, the polymerisation mixture is stirred for another 3 hours at 70° C. in order to complete polymerisation.

(B) Blending, precipitation and compounding 3380 g. of the 32.13% graft polymer latex obtained in accordance with A are mixed with 4820 g. of a 41.8% copolymer latex obtained by the emulsion polymerisation of styrene and acrylonitrile in a ratio of 70:30 (K-value 60, intrinsic viscosity 0.75 as measured in dimethyl formamide at 20° C.). The ratio of graft polymer to resin is thus 35:65. Following the addition of 15.5 g. of an antiager, such as 2,6-di-tert.-butyl-p-cresol, the latex mixture is coagulated by the addition of an equal volume of 2% acetic acid. The coagulate is filtered off, washed and dried. The fine-grained polymer is consolidated into a rough sheet on mixing rolls heated to 170° C. The sheet thus obtained is subsequently granulated. The granulate is injection-moulded into standard small test bars whose physical data are set out in Table 1, column 1.

COMPARISON EXAMPLE A

A graft polymer is prepared as described in Example 1, except that 7.5 g. of potassium persulphate is used as activator. This initiator is added in the form of an aqueous solution to the polybutadiene latex. In other respects, the procedure is as already described in Example 1. The properties of the blend are set out in Table 1, column A.

COMPARISON EXAMPLE B

A graft polymer is prepared as described in Example 1, except that 7.5 g. of azoisobutyrodinitrile is used as activator. The graft reaction is accompanied by coagulate-formation which, after drying, constituted 4.15% based on the total mixture. The resulting graft polymer latex is further processed in the same way as described in Example 1. The properties of this blend are set out in Table 1, column B.

TABLE 1

| Example | 1 | A | B |
|---|---|---|---|
| Ratio of graft polymer to resin component | 35:65 | 35:65 | 35:65 |
| Polybutadiene content of the end product, percent | 17.5 | 17.5 | 17.5 |
| Activation: | | | |
| Acetyl-(2-cyanoisopropyl)-diazene | 0.5 | | |
| Potassium persulphate | | 0.5 | |
| Azoisobutyrodinitrile | | | 0.5 |
| DIN 53543: | | | |
| Notched impact strength (kp. cm./cm.$^2$): | | | |
| 20° C | 24.1 | 13.0 | 16.0 |
| −20° C | 17.5 | 7.5 | 6.3 |
| Impact strength (kp. cm./cm.$^2$): | | | |
| 20° C | [1] n.b. | [2](5) 102.5 | [1] n.b. |
| −40° C | [2](3) 107.5 | 96.3 | 82.9 |
| DIN 53546: Ball indentation hardness (kp./cm.$^2$) 60″ | 825 | 840 | 750 |

[1] n.b.—not broken (applies to Table 1 and the following tables).
[2] Number of test specimens broken out of a total of 10 (applies to Table 1 and the following tables).

It is clear both from Table 1 and from the following tables that the moulding compositions prepared by the process according to the invention show much better impact strength than those synthesised with the assistance of conventional activators.

EXAMPLE 2

This example demonstrates the preparation and properties of a graft polymer in whose preparation all the styrene and acrylonitrile are polymerised in the presence of the graft base.

Following the procedure already described in Example 1, 453 g. of a 58.0% polybutadiene latex are diluted with 2533 g. of salt-free water. After the air has been displaced by nitrogen, the mixture is heated to 65° C. The following components are uniformly introduced over a period of 4 hours:

(a) A mixture of 891 g. of styrene (stabilised), 346.5 g. of acrylonitrile, 4.5 g. of tert.-dodecylmercaptan and 7.5 g. of acetyl-(2-cyanoisopropyl)-diazene:

(b) An emulsifier solution consisting of 375 g. of Lewatit water, 42.8 of the sodium salt of disproportionated abietic acid and 22.5 g. of normal sodium hydroxide solution.

The polymer is worked up, further processed and tested as described in Example 1. The test data are set out in Table 2, column 2.

COMPARISON EXAMPLE C

If the acetyl-(2-cyanoisopropyl)-diazene used in Example 2 is replaced by an equivalent quantity of potassium persulphate and if, in other respect, the procedure is the same as already described above, a moulding composition with the properties set out in Table 2, column C is obtained.

TABLE 2

| Example | 2 | c | 3 |
|---|---|---|---|
| Ratio of polybutadiene to graft monomers | 17.5:82.5 | 17.5:82.5 | 17.5:82.5 |
| Polybutadiene content of the end product, percent | 17.5 | 17.5 | 17.5 |
| Activation: | | | |
| Acetyl-(2-cyanoisopropyl)-diazene | 0.5 | | 1.0 |
| Potassium persulphate | | 0.5 | |
| DIN 53543: | | | |
| Notched impact strength (kp. cm./cm.²): | | | |
| 20° C | 20.0 | 5.7 | 19.3 |
| −20° C | 14.5 | 5.0 | 2.7 |
| Impact strength (kp. cm./cm.²): | | | |
| 20° C | n.b. | (2) 104.2 | (2) 105.4 |
| −40° C | (6) 103.5 | 101.3 | 55.0 |
| DIN 53456: Ball indentation hardness (kp./cm.²) 60″ | 830 | 870 | 780 |

EXAMPLE 3

This example demonstrates the preparation and properties of a graft polymer in which a methyl methacrylate in addition to styrene and acrylonitrile is grafted onto the graft base. All the graft monomers are polymerised in the presence of the graft base.

Following the procedure already described in Example 1, 456.5 g. of a 57.5% polybutadiene latex with an average particle size of 0.35μ (solids content 263.5 g.) are diluted with 2430 g. of salt-free water. After the air has been displaced with nitrogen and the reaction temperature adjusted to 65° C. the following components are uniformly introduced over a period of 5 hours:

(a) A mixture of 534.0 g. of styrene (stabilised), 207 g. of acrylonitrile, 495 g. of methyl methacrylate, 4.5 g. of tert.-dodecylmercaptan and 15.0 g. of acetyl-(2-cyanoisopropyl)-diazene;

(b) An emulsifier solution of 375 g. of salt-free water, 45 g. of the sodium salt of a paraffin sulphonic acid containing from 12 to 18 carbon atoms and 1.5 g. of sodium pyrophosphate.

The polymer is further processed and tested as already described above. The data obtained from standard small test bars are set out in Table 2, column 3.

EXAMPLES 4–8

Under the same test conditions as those described in Example 1, the acetyl-(2-cyanoisopropyl)-diazene used in that example is replaced by the following activators.

| Example: | Activator |
|---|---|
| 4 | Propionyl-(2-cyanoisopropyl)-diazene. |
| 5 | Acetyl-(carbethoxy)-diazene. |
| 6 | Benzoyl-(2-cyanoisopropyl)-diazene. |
| 7 | Adipoyl-bis-(2-cyanoisopropyl)-diazene. |
| 8 | Acetyl-(1-cyanocyclohexyl)-diazene. |

A copolymer of 90 parts of butadiene and 10 parts of styrene is used as the graft base in the form of a 58% latex. 432 g. of styrene and 168 g. of acrylonitrile are grafted on, based on 900 parts by weight of solid polymer. Admixture with the styrene-acrylonitrile resin component is carried out in such a way that 12.5% by weight of the graft base are present in the end product. The test data obtained from the various test specimens after further processing are set out in Table 3.

EXAMPLE 9

A graft polymer is prepared as described in Example 1(A). The resulting latex is blended with a separately prepared copolymer latex of 70 parts of α-methyl styrene and 30 parts of acrylonitrile (K-value 61.5) in such a way that there are 75 parts of α-methyl styrene/acrylonitrile resin to 25 parts of graft polymer, based on 100 parts by weight of solid polymer. Precipitation with a 2% aluminium sulphate solution gives a moulding composition which, after further processing, has the properties set out in Table 4, column 9.

EXAMPLE 10

Following the procedure of Example 3, a graft polymer with the following composition is prepared: 27.5% by weight of polybutadiene, 31.3% by weight of styrene, 12.2% by weight of acrylonitrile and 29.0% by weight of methyl methacrylate. In this example, too, acetyl-(2-cyanoisopropyl)-diazene was used as activator. The mechanical data obtained from standard small test bars prepared from this graft polymer are set out in Table 4, column 10.

COMPARISON EXAMPLE D

A graft polymer of the following composition is prepared as described in Example 3: 27.5% by weight of polybutadiene, 31.3% by weight of styrene, 12.2% by weight of acrylonitrile and 29.0% by weight of methyl methacrylate. In contrast to Example 6, activation was carried out by the addition of 2.25 parts by weight of sodium formaldehyde sulphoxylate and 2.25 parts by weight of cumene hydroperoxide. The properties possessed by this moulding composition after it has been worked up and further processed into standard small test bars are set out in Table 4, column D.

TABLE 3

| Example | 4 | 5 | 6 | 7 | 8 |
|---|---|---|---|---|---|
| Graft base content | 12.5 | 12.5 | 12.5 | 12.5 | 12.5 |
| Activation | 0.5 | 0.5 | 0.5 | 0.5 | 0.5 |
| DIN 53543: | | | | | |
| Notched impact strength (kp./cm.²): | | | | | |
| 20° C | 16.0 | 15.4 | 16.0 | 13.6 | 14.8 |
| −20° C | 15.4 | 11.1 | 10.0 | 7.4 | 13.0 |
| Impact strength (kp. cm./cm.²): | | | | | |
| 20° C | n.b. | (4) 103.8 | n.b. | n.b. | n.b. |
| −40° C | (7) 84.2 | 78.3 | (6) 113.3 | 65.7 | (4) 100.8 |
| DIN 53456: Ball indentation hardness (kp./cm.²) 60″ | 890 | 855 | 850 | 875 | 810 |

TABLE 4

| Example | 9 | 10 | D |
|---|---|---|---|
| Graft base content | 12.5 | 12.5 | 12.5 |
| Activation: | | | |
| Acetyl-(2-cyanoisopropyl)-diazine | 0.5 | 0.5 | |
| Cumene hydroperoxide | | | 0.15 |
| Sodium formaldehyde sulphoxylate | | | 0.15 |
| DIN 53543: | | | |
| Notched impact strength (kp. cm./cm.²): | | | |
| 20° C | 18.7 | 25.5 | 15.4 |
| −20° C | 8.0 | 17.8 | 9.3 |
| Impact strength (kp. cm./cm.²) 20° C | (3) 111.0 | n.b. | n.b. |
| DIN 53456: Ball indentation hardness (kp./cm.²) 60″ | 940 | 650 | 730 |

What is claimed is:

1. In the process of producing a graft copolymer by emulsion polymerizing at least 20 parts by weight of a mixture of monomers comprising (a) styrene or a mixture of styrene and methylmethacrylate and (b) acrylonitrile in the presence of 100 parts by weight of a butadiene polymer latex, the improvement comprising carrying out said emulsion polymerization in the presence of a catalytic amount of a compound of the formula

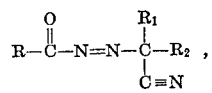

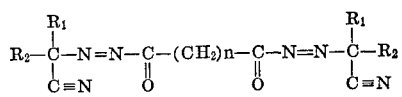

or

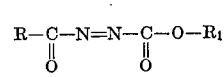

wherein R is phenyl or alkyl having 1 to 6 carbon atoms; $R_1$ and $R_2$ are each separately alkyl having 1 to 6 carbon atoms or together with the carbon atom to which they are attached complete a cycloalkyl radical having 4 to 8 carbon atoms and $n$ is an integer of from 1 to 8.

2. The improved process of claim 1 wherein said monomer mixture comprises styrene and acrylonitrile.

3. The improved process of claim 1 wherein from 0.1 to 3% by weight of said compound of said formula, based on the weight of said mixture of monomers, is employed.

References Cited

UNITED STATES PATENTS

| | | | |
|---|---|---|---|
| 3,442,979 | 5/1969 | Ott et al. | 260—880 |
| 3,449,472 | 6/1969 | Coover et al. | 260—880 |

JAMES A. SEIDLECK, Primary Examiner

U.S. Cl. X.R.

260—93.5, 879